US009905203B2

United States Patent
Lu et al.

(10) Patent No.: US 9,905,203 B2
(45) Date of Patent: Feb. 27, 2018

(54) INTERACTIVE DISPLAY SYSTEM WITH HMD AND METHOD THEREOF

(71) Applicant: HTC Corporation, Taoyuan (TW)

(72) Inventors: Chia-Yin Lu, Taoyuan (TW); You-Lin Song, Taoyuan (TW)

(73) Assignee: HTC Corporation, Taoyuan (TW)

(*) Notice: Subject to any disclaimer, the term of this patent is extended or adjusted under 35 U.S.C. 154(b) by 0 days.

(21) Appl. No.: 15/062,173

(22) Filed: Mar. 6, 2016

(65) Prior Publication Data
US 2017/0256240 A1    Sep. 7, 2017

(51) Int. Cl.
| G06F 3/01 | (2006.01) |
| G09G 5/36 | (2006.01) |
| G09G 5/397 | (2006.01) |
| G09G 5/00 | (2006.01) |
| G02B 27/01 | (2006.01) |
| G02B 27/00 | (2006.01) |

(52) U.S. Cl.
CPC ......... *G09G 5/397* (2013.01); *G02B 27/0093* (2013.01); *G02B 27/0172* (2013.01); *G06F 3/012* (2013.01); *G09G 5/006* (2013.01); *G09G 5/363* (2013.01); *G02B 2027/014* (2013.01); *G02B 2027/0187* (2013.01); *G09G 2320/0252* (2013.01); *G09G 2340/16* (2013.01); *G09G 2350/00* (2013.01); *G09G 2354/00* (2013.01); *G09G 2360/12* (2013.01); *G09G 2360/18* (2013.01)

(58) Field of Classification Search
None
See application file for complete search history.

(56) References Cited

U.S. PATENT DOCUMENTS

| 5,841,439 | A | 11/1998 | Pose et al. | |
| 5,953,014 | A * | 9/1999 | Wood | H04N 13/0055 |
| | | | | 345/422 |
| 2009/0110291 | A1* | 4/2009 | Matsumura | G06T 7/0075 |
| | | | | 382/195 |
| 2010/0026714 | A1* | 2/2010 | Utagawa | G02B 27/017 |
| | | | | 345/633 |
| 2010/0310155 | A1* | 12/2010 | Newton | H04N 13/0055 |
| | | | | 382/154 |
| 2012/0121163 | A1* | 5/2012 | Zhang | H04N 5/144 |
| | | | | 382/154 |

(Continued)

OTHER PUBLICATIONS

"Search Report of European Counterpart Application," dated Jun. 22, 2017, p. 1-p. 4.

*Primary Examiner* — Joni Richer
(74) *Attorney, Agent, or Firm* — JCIPRNET

(57) ABSTRACT

Interactive display system and method are provided, and the interactive display system includes a head-mounted display and an electronic device. The head-mounted display is configured to be worn by a user. The electronic device generates a previous frame and frame pixel depth information and transmits the previous frame and the frame pixel depth information to the head-mounted display so that the head-mounted display displays the previous frame. The head-mounted display generates current state information in response to a motion of the user and generates a current frame according to the current state information, the previous frame and the frame pixel depth information. The head-mounted display displays the current frame.

17 Claims, 2 Drawing Sheets

(56) References Cited

U.S. PATENT DOCUMENTS

2013/0141461 A1\* 6/2013 Salter .................... G06T 7/0044
                                                      345/633
2014/0087867 A1   3/2014 Hightower
2015/0379772 A1  12/2015 Hoffman
2016/0238852 A1\* 8/2016 Ellsworth .......... G02B 27/0179

\* cited by examiner

INTERACTIVE DISPLAY SYSTEM WITH HMD AND METHOD THEREOF

BACKGROUND OF THE INVENTION

Field of the Invention

The invention generally relates to an interactive display system and an interactive display method, and in particular, to an interactive display system and an interactive display method by using a head-mounted display.

Description of Related Art

With advances in technology, the interactive display system is gradually mature and also provides audio and video enjoyment to people. A head-mounted display (HMD) is an important part in the interactive display system, and the head-mounted display can provide a plurality of continuous frames to allow the user to enter a virtual world constructed by the interactive display system. However, the head-mounted display is often limited by the bandwidth of the wired or wireless connection interface, and therefore, the frame refresh rate of the head-mounted display cannot be improved. Besides, when the frame refresh rate is too low, the frame latency may increase relatively. As a result, the head-mounted display cannot display the corresponding frame instantly with rotation of the user's head. Therefore, how to improve the frame refresh rate of the head-mounted display and reduce the frame latency has become a major issue in the design of the interactive display system.

SUMMARY OF THE INVENTION

The invention provides an interactive display system and an interactive display method, which generate a current frame by using current state information, a previous frame and frame depth information in the head-mounted display, thereby improving frame refresh rate of the head-mounted display and reducing frame latency.

The interactive display system of the invention includes a head-mounted display and an electronic device. The head-mounted device is adapted to be worn by a user. The electronic device generates a previous frame and frame pixel depth information and transmits the previous frame and the frame pixel depth information to the head-mounted display, so that the head-mounted display displays the previous frame. The head-mounted display generates current state information in response to a motion of the user and generates a current frame according to the current state information, the current frame and the frame pixel depth information. Besides, the head-mounted display displays the current frame.

In an embodiment of the invention, the head-mounted display includes a first frame buffer, a first depth buffer and a sensing unit. The first frame buffer stores the current frame. The first depth buffer stores the frame pixel depth information. The sensing unit senses the motion of the user to generate a first sensing data. Besides, the head-mounted display calculates current state information according to the first sensing data.

The interactive display method of the invention is adapted to an interactive display system, which comprises an electronic device and a head-mounted display, the head-mounted display is adapted to be worn by a user, and the interactive display method includes the following steps. A previous frame and frame pixel depth information are generated through the electronic device. The previous frame and the frame pixel depth information are transmitted to the head-mounted display. The previous frame is displayed through the head-mounted display. Current state information of the head-mounted display is generated in response to a motion of the user. A current frame is generated according to the current state information, the previous frame and the frame pixel depth information of the head-mounted device. The current frame is displayed through the head-mounted device.

Based on the above, the electronic device in the interactive display system transmits the previous frame and the frame pixel depth information to the head-mounted display, and the head-mounted display generates the current frame by using the current state information, the previous frame and the frame depth information. Therefore, the frame refresh rate of the head-mounted display may be improved and the frame latency may be reduced.

In order to make the aforementioned and other features and advantages of the invention more comprehensible, several embodiments accompanied with figures are described in detail below.

DESCRIPTION OF THE EMBODIMENTS

Figure 1:
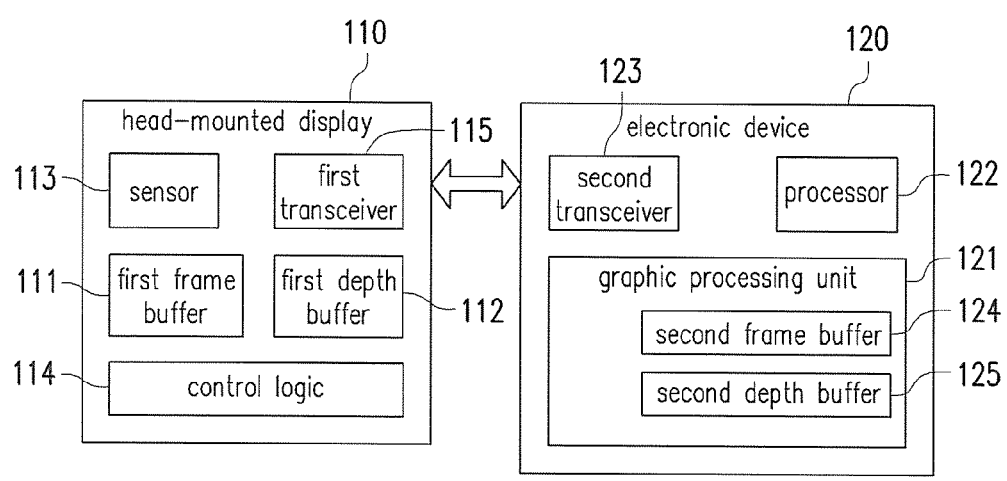
FIG. 1 is a block diagram illustrating an interactive display system according to an embodiment of the invention.

FIG. 1 is a block diagram illustrating an interactive display system according to an embodiment of the invention. As shown in FIG. 1, the interactive display system 100 includes a head-mounted display 110 and an electronic device 120. The electronic device 120 may be, for example, a personal computer, and the head-mounted display 110 is adapted to be worn on the head of the user. In the application, the head-mounted display 110 may generate a plurality of continuous frames. With the changes of the user's posture, the head-mounted display 110 may adjust the displayed frame instantly to allow the user to enter a virtual world constructed by the interactive system 100.

Figure 2:
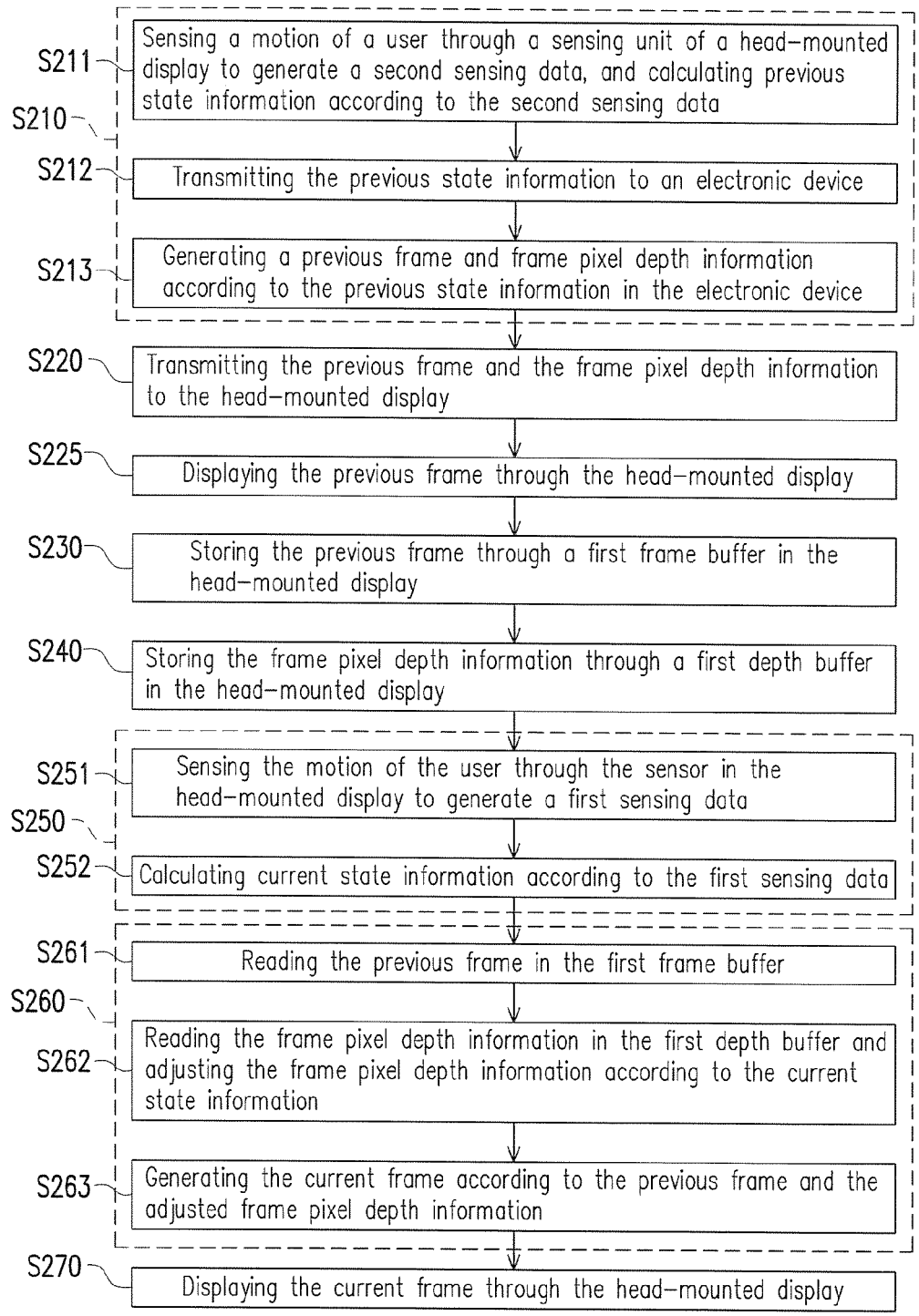
FIG. 2 is a flow chart illustrating an interactive display method according to an embodiment of the invention.

FIG. 2 is a flow chart illustrating an interactive display method according to an embodiment of the invention, and the operation of the interactive display system 100 is further described below with reference to FIG. 1 and FIG. 2. As shown in step S210, the electronic device 120 may generate a previous frame and frame pixel depth information. Furthermore, as shown in step S220, the electronic device 120 may transmit the previous frame and the frame pixel depth information to the head-mounted display 110.

More specifically, the head-mounted display 110 includes a first frame buffer 111, a first depth buffer (or called Z-buffer) 112, a sensing unit 113 and a control logic 114. When the previous frame and the frame pixel depth information from the electronic device 120 are received, as shown in step S225, the head-mounted device 110 may display the previous frame from the electronic device 120. Furthermore, as shown in step S230 and step S240, the head-mounted display 110 may store the previous frame through the first frame buffer 111 and store the frame pixel depth information through the first depth buffer 112. The head-mounted display 110 may track or sense a head movement of the user continuously through the sensing unit 113 and generate a plurality of sensing data. Besides, the head-mounted display 110 may determine the posture of the user according to the sensing data and generate the corresponding frame according to the determined result.

For example, as shown in step S250, the head-mounted display 110 may generate current state information in response to a motion of the user. Specifically, when the posture of the user changes, as shown in step S251, the sensing unit 113 may sense the motion of the user and generate a first sensing data. Besides, as shown in step S252, the control logic 114 of the head-mounted display 110 may calculate the current state information according to the first sensing data. Furthermore, as shown in step S260, the head-mounted display 110 may generate a current frame according to the current state information, the previous frame and the frame pixel depth information. Specifically, as shown in step S261, the control logic 114 may read the previous frame in the first frame buffer 111. As shown in step S262, the control logic 114 may further read the frame pixel depth information in the first depth buffer 112 and adjust the frame pixel depth information according to the current state information. As shown in step S263, the control logic 114 may generate the current frame according to the previous frame and the adjusted frame pixel depth information.

It is noted that, in step S210, the electronic device 120 may also generate the previous frame and the frame pixel depth information with reference to previous state information returned from the head-mounted display 110. For example, in an embodiment, the head-mounted display 110 further includes a first transceiver 115, and the electronic device 120 includes a graphic processing unit 121, a processor 122 and a second transceiver 123.

In terms of the detailed steps of step S210, as shown in step S211, the sensing unit 113 of the head-mounted display 110 may sense the motion of the user to generate a second sensing data, and the control logic 114 of the head-mounted display 110 may calculate previous state information according to the second sensing data. As shown in step S212, the head-mounted display 110 may transmit the previous state information to the second transceiver 123 of the electronic device 120 through the first transceiver 115. As shown in step S213, the graphic processing unit 121 of the electronic device 120 may generate the previous frame and the frame pixel depth information according to the previous state information. Besides, the electronic device 120 may transmit the previous frame and the frame pixel depth information to the first transceiver 115 of the head-mounted display 110 through the second transceiver 123.

In other words, before the electronic device 120 transmits the previous frame and the frame pixel depth information, the head-mounted display 110 may transmit the previous state information to the electronic device 120 in response to the motion of the user, so that the electronic device 120 may generate the previous frame and the frame pixel depth information according to the previous state information. It should be noted that, the graphic processing unit 121 of the electronic device 120 includes a second frame buffer 124 and a second depth buffer 125. The graphic processing unit 121 may store the previous frame through the second frame buffer 124 and store the frame pixel depth information through the second depth buffer 125. Besides, before the frame pixel depth information is transmitted by the second transceiver 123, the electronic device 120 may compress the frame pixel depth information through the processor 122 to reduce storage space of the frame pixel depth information in the head-mounted display 110.

Referring to FIG. 1 and FIG. 2, as shown in step S270, the head-mounted display 110 may display the current frame. In other words, in addition to displaying the previous frame from the electronic device 120, the head-mounted display 110 may further display the current frame generated by itself. Besides, the head-mounted display 110 may detect or track the motion of the user and generate the current frame by using the detected state information, the stored previous frame and the stored frame pixel depth information, so as to significantly reduce the time for generating the frame. As a result, the frame refresh rate of the head-mounted display 110 may be improved and the frame latency may be effectively reduced. Besides, with the increase of the frame refresh rate, the blurring effect of the head-mounted display 110 may also be reduced.

For example, in the embodiment of FIG. 1, the interactive display system 100 establishes a wireless connection interface between the head-mounted display 100 and the electronic device 120 by using the first transceiver 115 and the second transceiver 123. If the frame refresh rate supported by the bandwidth of the wireless connection interface is 30 frames per second (fps), in addition to receiving 30 frames from the electronic device 120 through the wireless connection interface, the head-mounted display 110 may further generate a plurality of frames which are inserted between the above-mentioned 30 frames. Thus, the frame refresh rate of the head-mounted display 110 may be significantly improved. For example, the frame refresh rate of the head-mounted display 110 may be improved to 90 fps.

In another embodiment, the transmission between the head-mounted display 110 and the electronic device 120 may be performed through a wired connection interface. For example, the first transceiver 115 and the second transceiver 123 may be respectively replaced by a High Definition Multimedia Interface (HDMI) connector, so as to form a wired connection interface between the head-mounted display 110 and the electronic device 120. Besides, if the frame refresh rate supported by the bandwidth of the wired connection interface is 45 fps, in addition to receiving 45 frames from the electronic device 120 through the wired connection interface, the head-mounted display 110 may further generate a plurality of frames which are inserted between the above-mentioned 45 frames. Thus, the frame refresh rate of the head-mounted display 110 may be significantly improved. In other words, the interactive display system 100 may improve the frame refresh rate of the head-mounted display 110 without increasing the bandwidth of the wired connection interface or the wireless connection interface.

To sum up, the electronic device in the interactive display system of the invention transmits the previous frame and the frame pixel depth information to the head-mounted display. Besides, the head-mounted display may generate the current state information in response to the motion of the user and generate the current frame by using the current state information, the previous frame and the frame pixel depth information. Therefore, the frame refresh rate of the head-mounted display may be improved and the frame latency may be reduced. Besides, with the increase of the frame refresh rate, the blur effect of the head-mounted display may also be reduced.

Although the invention has been described above with embodiments, however it is not limited thereto. It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An interactive display system comprising:
a head-mounted display configured to be worn by a user and comprising a sensor, wherein the sensor senses a head movement of the user to generate a first sensing data, and the head-mounted display calculates current state information according to the first sensing data; and
an electronic device generating a previous frame and frame pixel depth information and transmitting the previous frame and the frame pixel depth information to the head-mounted display, so that the head-mounted display displays the previous frame,
wherein the head-mounted display stores the previous frame and the frame pixel depth information from the electronic device and generates a current frame according to the current state information, the stored previous frame and the stored frame pixel depth information, and the head-mounted display displays the current frame.

2. The interactive display system according to claim 1, wherein the head-mounted display further comprises:
a first frame buffer storing the previous frame; and
a first depth buffer storing the frame pixel depth information.

3. The interactive display system according to claim 2, wherein before the electronic device transmits the previous frame and the frame pixel depth information, the sensor generates a second sensing data, the head-mounted display calculates previous state information according to the second sensing data and transmits the previous state information to the electronic device, and the electronic device generates the previous frame and the frame pixel depth information according to the previous state information.

4. The interactive display system according to claim 3, wherein the interactive display system transmits the previous state information, the previous frame and the frame pixel depth information between the head-mounted display and the electronic device through a wireless connection interface or a wired connection interface.

5. The interactive display system according to claim 3, wherein the head-mounted display further comprises:
a first transceiver transmitting the previous state information to the electronic device and receiving the previous frame and the frame pixel depth information from the electronic device.

6. The interactive display system according to claim 5, wherein electronic device comprises:
a graphic processing unit generating the previous frame and the frame pixel depth information according to the previous state information; and
a second transceiver receiving the previous state information from the first transceiver and transmitting the previous frame and the frame pixel depth information to the first transceiver.

7. The interactive display system according to claim 6, wherein the graphic processing unit stores the previous frame through a second frame buffer and stores the frame pixel depth information through a second depth buffer.

8. The interactive display system according to claim 6, wherein the electronic device further comprises a processor configured to compress the frame pixel depth information before the second transceiver transmits the frame pixel depth information.

9. The interactive display system according to claim 3, wherein the head-mounted display further comprises a control logic, the control logic reads the frame pixel depth information in the first depth buffer and adjusts the frame pixel depth information according to the current state information, and the control logic generates the current frame according to the previous fame and the adjusted frame pixel depth information.

10. The interactive display system according to claim 9, wherein the head-mounted display calculates the previous state information and the current state information through the control logic.

11. An interactive display method adapted to an interactive display system which comprises an electronic device and a head-mounted display, wherein the head-mounted display is configured to be worn by a user, and the interactive display method comprises:
generating a previous frame and frame pixel depth information through the electronic device;
transmitting the previous frame and the frame pixel depth information to the head-mounted display, and storing the previous frame and the frame pixel depth information in the head-mounted display;
displaying the previous frame through the head-mounted display;
sensing a head movement of the user through a sensor of the head-mounted display to generate a first sensing data, and calculating current state information according to the first sensing data by the head-mounted display;
generating a current frame according to the current state information, the stored previous frame and the stored frame pixel depth information of the head-mounted device; and
displaying the current frame through the head-mounted device.

12. The interactive display method according to claim 11, wherein the step of generating the previous frame and the frame pixel depth information through the electronic device comprises:
before transmitting the previous frame and the frame pixel depth information to the head-mounted display, sensing the motion of the user through the sensor to generate a second sensing data and calculating previous state information according to the second sensing data;
transmitting the previous state information to the electronic device; and
generating the previous frame and the frame pixel depth information according to the previous state information in the electronic device.

13. The interactive display method according to claim 12, wherein the interactive display system transmits the previous state information, the previous frame and the frame pixel depth information between the head-mounted display and the electronic device through a wireless connection interface or a wired connection interface.

14. The interactive display method according to claim 13, wherein the wireless connection interface comprises a first transceiver in the head-mounted display and a second transceiver in the electronic device.

15. The interactive display method according to claim 11, further comprises:
storing the previous frame through a first frame buffer in the head-mounted display; and
storing the frame pixel depth information through a first depth buffer in the head-mounted display.

16. The interactive display method according to claim 15, wherein the step of generating the current frame according to the current state information, the stored previous frame and the stored frame pixel depth information of the head-mounted device comprises:

reading the previous frame in the first frame buffer;

reading the frame pixel depth information in the first depth buffer and adjusting the frame pixel depth information according to the current state information; and generating the current frame according to the previous frame and the adjusted frame pixel depth information.

17. The interactive display method according to claim 16, wherein the electronic device comprises a graphic processing unit configured to generate the previous frame and the frame pixel depth information according to a previous state information from the head-mounted display, and the graphic processing unit stores the previous frame through a second frame buffer and stores the frame pixel depth information through a second depth buffer.

\* \* \* \* \*